United States Patent Office 2,711,434
Patented June 21, 1955

2,711,434

PROCESS FOR THE PRODUCTION OF A MICROPOROUS VULCANIZATE

Heinrich Ziegner, Hagen, Westphalia, Germany, assignor to Accumulatoren-Fabrik Aktiengesellschaft, Hagen, Germany No Drawing. Application March 10, 1952,
Serial No. 275,850

Claims priority, application Germany March 12, 1951

6 Claims. (Cl. 260—722)

The invention relates to a process for the production of a micro-porous vulcanizate of hard or soft rubber which is interspersed with a large number of interconnected cavities of micoscopic proportions. Numerous manufacturing processes for such vulcanizates have already been proposed. For these the initial material was preferably latex which, as a result of its watery characteristics, is particularly suited for this purpose. However, the price of latex is considerably higher for most applications than that of crude rubber. However, where rubber is the initial material, we have the disadvantage that the normal coagulated raw caoutchouc does not very readily permit of being mixed with water. Crude or raw caoutchouc repels water on the rollers or in the mixing machines almost completely, so that the water evaporates already in the mixing process. For that reason an admixture of watery or dry silica gel has already been proposed in order to obtain the desired porosity. With watery silica gel, however, the difficulty exists that the water is separated during mixing and then evaporates. By admixing dry silica gel only very little porosity is obtained. Also the use of intermediate stages between watery and dry silica gel resulted in considerable disadvantages, because the procedure of the initial drying, i. e. of the initial treatment of the watery silica gel is extremely difficult to carry out.

In the process in accordance with the invention for the production of a micro-porous vulcanizate of hard or soft rubber by adding a silica gel to a rubber mixture, the above disadvantages are avoided and further advantages are obtained in a manner that a substance having a high boiling point, preferably glycerine which increases the vaporization point of the water and enhances the water absorbing qualities of the rubber is well ground with a gel former, sulfur, an accelerator and a filler, for example, kaolin, whereupon water glass is added while stirring constantly until the entire mixture gels forming a crumbly mass, from which a uniform mixture is made with crude rubber on a roller which is subsequently worked on a calendering machine or an extruding machine and vulcanized.

In this manner the water which is contained in the normal, freshly prepared silica gel is completely preserved during the mixing process in order to develop the porousness. Instead of glycerine other substances which have a high boiling point may be used, for example, ethylene glycol. Inasmuch as it is possible in accordance with the invention to mix the oil readily with the rubber, it is retained in its form, i. e. it is not crushed on the roller.

In a further development of the process in accordance with the invention no acid is used for the purpose of forming the silica gel, but an acid free gel former, for example, ammonia with glycerine, as it has been found to be particularly advantageous to avoid all acid components in any mixture containing caoutchouc. If the microporous vulcanizate of hard or soft rubber is to be utilized for separators in electric storage batteries, a metal-free accelerator, such as tetramethyl-thiuram disulfide is used in accordance with the invention. For other purposes zinc oxide may, however, be used as the accelerator. The silica gel is preferably formed from sodium water glass. In accordance with tests the proportion to be used is four or five parts of sodium water glass to one part of glycerine. The total weight of the oils including the fillers should be approximately five times the amount of crude rubber if it is desired to obtain a micro-porous vulcanizate of especially high quality.

Example 250 g. glycerine are well ground with
200 g. sulfur, 100 g. tetramethyl-thiuram disulfite,
50 g. kaoline and 100 g. ammonia water and then
1200 g. sodium water glass is added
with constant stirrring the mixture gels, forming a crumbly mass. This mass is then added to 400 g. of previously rolled crude rubber on the usual mixing roller.

The mixture can be prepared like normal rubber mixtures and, if need be it can be further worked and vulcanized on a calendering machine or on an extruding machine.

By suitably decreasing the proportion of sulfur it is also possible to obtain micro-porous soft rubber vulcanizates. The possibility also exists to add still other known agents which increase the porousness still further, such as starch, ammonium carbonate, etc.

Having now fully described the nature of my invention and the manner of executing it, what I claim is:

1. Process for the production of a micro-porous vulcanizate of rubber in which a silica gel is added to a rubber mixture in amounts of approximately three parts by weight of silica gel to one part of rubber, including the steps of grinding a substance of the group consisting of glycerine and ethylene glycol, which raises the evaporation point of the water and enhances the water absorption of the rubber with ammonia and glycerine as a gel former, sulfur, an accelerator and kaoline, adding water glass while stirring constantly until the mixture gels to a crumbly mass, combining said mass in a uniform mixture with crude rubber on a roller and subsequently working and vulcanizing said mixture on a suitable machine.

2. Process for the production of a micro-porous vulcanizate of rubber in which the silica gel is added to a rubber mixture in amounts of approximately three parts by weight of silica gel to one part of rubber, including the steps of grinding a substance of the group consisting of glycerine and ethylene glycol, which raises the evaporation point of the water and enhances the water absorption of the rubber with ammonia and glycerine as a gel former, sulfur, a metal free accelerator and kaoline, adding water glass while stirring constantly until the mixture gels to a crumbly mass, combining said mass in a uniform mixture with crude rubber on a roller and subsequently working and vulcanizing said mixture on a suitable machine.

3. Process for the production of a micro-porous vulcanizate of rubber in which a silica gel is added to a rubber mixture in amounts of approximately three parts by weight silica gel to one part of rubber, including the steps of grinding a substance of the group consisting of glycerine and ethylene glycol, which raises the evaporation point of the water and enhances the water absorption of the rubber with ammonia and glycerine as a gel former, sulfur, a metal free accelerator and kaoline, adding sodium water glass while stirring constantly until the mixture gels to a crumbly mass, combining said mass in a uniform mixture with crude rubber on a roller and subsequently working and vulcanizing said mixture on a suitable machine.

4. Process for the production of a micro-porous vulcanizate of rubber in which a silica gel is added to a rubber mixture in amounts of approximately three parts by weight of silica gel to one part of rubber, including the steps of grinding a substance of the group consisting of glycerine and ethylene glycol, which raises the evaporation point of the water and enhances the water absorption of the rubber with ammonia and glycerine as a gel former, sulfur, an accelerator and kaoline, adding sodium water glass in proportions of four to five parts of sodium water glass to one part of glycerine while stirring constantly until the mixture gels to a crumbly mass, combining said mass in a uniform mixture with crude rubber on a roller and subsequently working and vulcanizing said mixture on a suitable machine.

5. Process for the production of a micro-porous vulcanizate of rubber in which a silica gel is added to a rubber mixture in amounts of approximately three parts by weight of silica gel to one part of rubber, including the steps of grinding a substance of the group consisting of glycerine and ethylene glycol, which raises the evaporation point of the water and enhances the water absorption of the rubber with ammonia and glycerine as a gel former, sulfur, an accelerator and kaoline, adding water glass while stirring constantly until the mixture gels to a crumbly mass, combining said mass in a uniform mixture with crude rubber on a roller and subsequently working and vulcanizing said mixture on a suitable machine, the total weight of the gel including the added substances being substantially five times that of the crude rubber.

6. Process for the production of a micro-porous vulcanizate of rubber in which a silica gel is added to a rubber mixture in amounts of approximately three parts by weight of silica gel to one part of rubber, including the steps of grinding a substance of the group consisting of glycerine and ethylene glycol, which raises the evaporation point of the water and enhances the water absorption of the rubber with ammonia and glycerine as a gel former, sulfur, tetramethyl thiuram disulfide and kaoline, adding water glass while stirring constantly until the mixture gels to a crumbly mass, combining said mass in a uniform mixture with crude rubber on a roller and subsequently working and vulcanizing said mixture on a suitable machine.

References Cited in the file of this patent

UNITED STATES PATENTS

| Number | Name | Date |
|---|---|---|
| 844,139 | Kelly | Feb. 12, 1907 |
| 1,957,370 | Thomas et al. | May 1, 1934 |
| 2,096,933 | Burgess | Oct. 26, 1937 |
| 2,181,891 | Hazell | Dec. 5, 1939 |
| 2,258,851 | Fisher et al. | Oct. 14, 1941 |
| 2,304,717 | Swart | Dec. 8, 1942 |
| 2,329,322 | Baty et al. | Sept. 14, 1943 |
| 2,505,353 | Fisk | Apr. 25, 1950 |
| 2,542,527 | Honey et al. | Feb. 20, 1951 |